(12) United States Patent
Hulten et al.

(10) Patent No.: US 8,073,608 B2
(45) Date of Patent: Dec. 6, 2011

(54) YAW STABILITY CONTROL SYSTEM

(75) Inventors: Johan Hulten, Göteborg (SE); Bengt Johan Henrik Jacobson, Mölnlycke (SE); Nenad Lazic, Göteborg (SE)

(73) Assignee: Volvo Car Corporation (SE)

( * ) Notice: Subject to any disclaimer, the term of this patent is extended or adjusted under 35 U.S.C. 154(b) by 463 days.

(21) Appl. No.: 12/429,207

(22) Filed: Apr. 24, 2009

(65) Prior Publication Data
US 2009/0271074 A1  Oct. 29, 2009

(30) Foreign Application Priority Data
Apr. 25, 2008  (EP) .................................. 08155182

(51) Int. Cl.
- *B62D 6/00* (2006.01)
- *B62D 5/04* (2006.01)
- *B62D 119/00* (2006.01)
- *B60T 8/1755* (2006.01)

(52) U.S. Cl. .......................................... 701/91; 701/43

(58) Field of Classification Search ................. 701/43, 701/91
See application file for complete search history.

(56) References Cited

U.S. PATENT DOCUMENTS

| | | | | |
|---|---|---|---|---|
| 5,141,069 A | * | 8/1992 | Yasui | 180/422 |
| 5,388,658 A | * | 2/1995 | Ando et al. | 180/197 |
| 5,648,903 A | * | 7/1997 | Liubakka | 701/41 |
| 5,774,819 A | * | 6/1998 | Yamamoto et al. | 701/41 |
| 5,925,083 A | * | 7/1999 | Ackermann | 701/41 |
| 6,131,688 A | * | 10/2000 | Fukada | 180/408 |
| 6,556,909 B2 | * | 4/2003 | Matsumoto et al. | 701/41 |
| 6,871,127 B2 | * | 3/2005 | Dominke et al. | 701/43 |
| 7,032,705 B2 | * | 4/2006 | Zheng et al. | 180/446 |
| 7,035,726 B2 | * | 4/2006 | Sakata | 701/72 |
| 7,070,247 B2 | * | 7/2006 | Offerle | 303/146 |
| 7,349,778 B2 | * | 3/2008 | Shin et al. | 701/41 |
| 7,647,150 B2 | * | 1/2010 | Katayama | 701/43 |
| 2002/0007239 A1 | * | 1/2002 | Matsumoto et al. | 701/41 |
| 2005/0189161 A1 | * | 9/2005 | Zheng et al. | 180/402 |
| 2005/0209763 A1 | * | 9/2005 | Offerle et al. | 701/83 |
| 2006/0076828 A1 | * | 4/2006 | Lu et al. | 303/146 |
| 2009/0157275 A1 | * | 6/2009 | Ito et al. | 701/72 |

FOREIGN PATENT DOCUMENTS

| | | |
|---|---|---|
| DE | 102005012548 A1 | 2/2006 |
| WO | WO 2006087141 A | 8/2006 |
| WO | WO 2007125083 A | 11/2007 |

\* cited by examiner

*Primary Examiner* — Mark Hellner
*Assistant Examiner* — Ari M Diacou
(74) *Attorney, Agent, or Firm* — Angela M. Brunetti

(57) ABSTRACT

The present invention relates to a yaw stability control system for a vehicle using a steering system and a method of controlling by detecting the occurrence of understeer, determining the degree of understeer after the occurrence of understeer is detected determining if the determined degree of understeer exceeds a threshold value, saving the steering wheel torque value and steering wheel angle value when determined that a calculated drop in steering wheel torque exceeds the threshold value, calculating a guidance torque, a driver-intended steering wheel angle, and updating the steering wheel angle at the start of the guidance torque calculation, applying the guidance torque to the steering of the vehicle, and using the driver-intended steering wheel angle for yaw stability control.

21 Claims, 2 Drawing Sheets

YAW STABILITY CONTROL SYSTEM

CROSS REFERENCE

The inventive subject matter is a continuation of foreign filed application EP 08155182.2, filed Apr. 25, 2008, whose subject matter is incorporated herein by reference and provides the basis for a claim of priority of invention under 35 U.S.C. § 119.

TECHNICAL FIELD

The inventive subject matter is directed to a yaw stability control system and more particularly to a yaw stability control system for a vehicle having an electric power assisted steering system.

BACKGROUND

Several vehicle control systems, which are used to augment the driving capability of a vehicle operator, currently exist. Those control systems include anti-brake-lock system (ABS), traction control system (TCS), and stability controls. Example stability control systems are electronic stability control (ESC) systems or sometimes referred to as yaw stability control (YSC) systems. Systems of this kind are also sometimes called ESP (Electronic Stability Program) systems or DSTC (Dynamic Stability Traction Control) systems.

The stability control systems are utilized to maintain controlled and stable vehicle operations for improved vehicle and occupant safety. The stability control systems are often used to maintain control of a vehicle following a desired travel direction, to prevent the vehicle from spinning out and help the driver maintain directional stability when cornering. This function is enabled through the ABS system to brake one or more of the wheels if a lateral slide or skidding is detected. More specifically, the above yaw stability control systems typically compare the desired direction of a vehicle based upon the steering wheel angle and the path of travel, which is determined from motion sensors located on the vehicle. By regulating the amount of braking at each corner of the vehicle and the traction force of the vehicle, the desired path of travel may be maintained.

Existing stability control systems are designed to correct undesired vehicle motion caused by a tire force disturbance, such as a tire force difference due to a road surface disturbance or due to a mismatch between the driving intention of a driver and a road surface condition. This mismatch usually happens when there is a significant difference between the front and the rear tire lateral forces applied to the vehicle (referred to as the lateral tire force difference), or there is a significant difference between the right and the left tire longitudinal tire forces (referred to as the longitudinal tire force difference), or a combination thereof. Such a tire force difference is called a tire force disturbance.

The existing yaw stability control systems are effective in controlling the undesired vehicle motions due to the aforementioned tire force disturbance. The yaw stability control systems activate brakes, reduce engine torque, or vary the driving torque at individual wheels or axles so as to generate an active tire force difference to counteract the effect of the tire force disturbance. That is, the control mechanism and the vehicle disturbance are from the same source: the tire force variations or the tire force differences.

For example, when a vehicle is driven at a high speed to negotiate a turn, the vehicle could saturate its front tire cornering forces such that there is a front-to-rear tire lateral force difference. Such a tire force disturbance will generate a yaw moment disturbance, which causes the vehicle to steer less than that requested by the driver. This is referred to as an understeer situation. When the existing yaw stability control systems are used, the rear inside wheel is braked to add a longitudinal force to generate a yaw moment to counteract the yaw moment disturbance generated by the tire force disturbance due to the front-to-rear tire lateral force difference.

However, this brake intervention is usually performed as a function of yaw rate error, where the yaw rate error is determined as the difference between a yaw rate target and a sensed yaw rate. The yaw rate target is normally calculated from a steering wheel angle, which may be considered indicative of the driver intent, and the vehicle velocity using a nonlinear, so called, bicycle model. This bicycle model is nonlinear in terms of a tire to road friction compensation.

Experienced drivers are sensitive to the torque feedback in the steering wheel. The steering wheel torque will decrease, even for higher steering wheel angles, before the position where the peak friction is passed. Using this information, provided through the steering wheel, the experienced driver may perform compensatory steering in order to utilize the tire to road friction in an optimal way on the front axle.

However, such driving by an experienced driver will result in small yaw rate errors in the yaw stability control system, usually below a threshold of the yaw stability control system, wherefore no yaw stability control intervention will be performed by the yaw stability control system. As a consequence thereof the rear axle tire to road friction of the vehicle will not be used in an optimal way.

SUMMARY

The present invention provides a method for controlling a yaw stability control system for a vehicle having an electric power assisted steering system. The method detects and determines a degree of understeer. The degree of understeer is compared to a threshold value. Upon comparison to the threshold value, a guidance torque is calculated, along with a steering wheel angle modifier. The guidance torque is applied to the steering system. The calculated steering wheel angle modifier is used, along with a measured steering wheel angle, to calculate a driver intended steering wheel angle that is applied as an input to the yaw stability control system.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
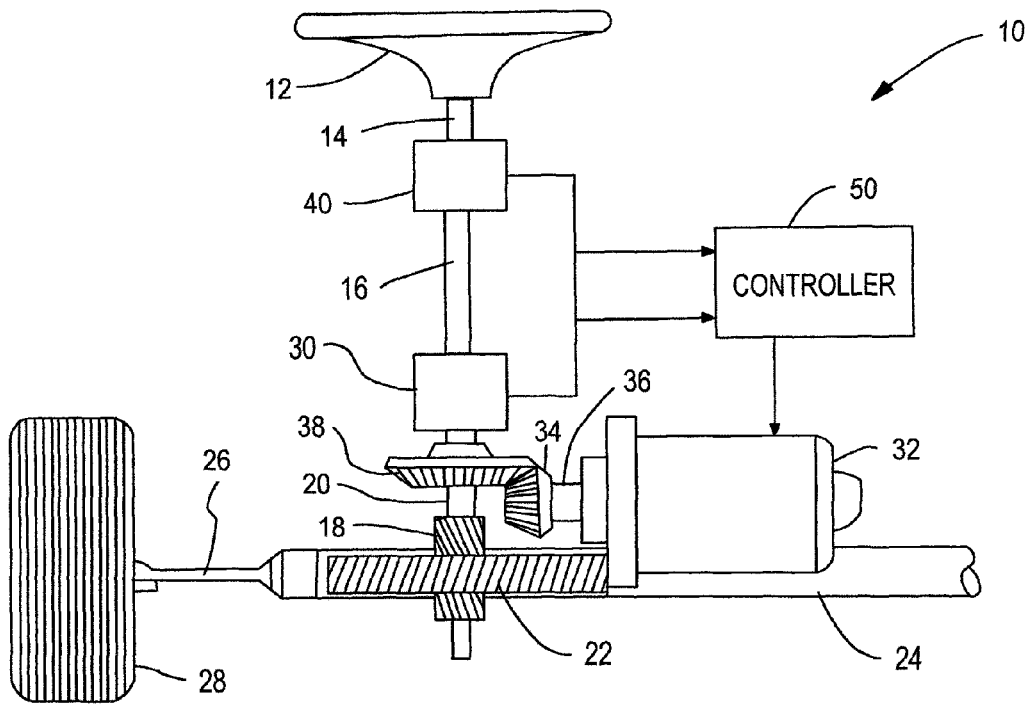
FIG. 1 is an electrically assisted power steering system.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and wheel 28 in a conventional manner. A steering torque sensor 30 is incorporated in the steering shaft 16 for detecting a steering torque applied by an operator to the steering shaft 16 by way of the steering wheel 12. A steering wheel angle sensor 40 senses a steering wheel angle. An electric motor 32 includes an output gear 34 mounted on an output shaft 36 for drivingly engaging an assist input gear 38 mounted on the steering shaft 16. The steering system is controlled by controller 50. It should be noted that this is only one example of several possible configurations for an electrically assisted power steering system. While an electrically assisted power steering system is shown, it should be noted that the inventive subject matter is equally applicable to a hydraulic steering system as well. For a hydraulic steering system, a sensor providing the steering wheel torque is required.

Electric power assisted steering systems are well known in the art. Electric power assisted steering systems that use, for example, a rack and pinion gear set to couple the steering column to the steered axle, provide power assist by using an electric motor to either apply rotary force to a steering shaft connected to a pinion gear, or apply linear force to a steering member having the rack teeth thereon. The electric motor in such systems is typically controlled in response to a driver's applied torque to the vehicle steering wheel, and sensed vehicle speed.

A vehicle driver is very sensitive to the steering wheel torque through haptic perception in such a way that the driver knows which torque corresponds to a certain combination of curvature and speed. Therefore, the steering wheel torque is a way of indicating the steering wish i.e. intent of the driver. Evidence in support of this view may be supported by the fact that it is almost impossible to drive a vehicle without any torque feedback in the steering wheel. There is a general perception that torque feedback in the steering wheel improves the handling of a vehicle, and therefore is quite important.

The steering wheel torque feedback effects that are most common are, an increase in driver torque as the lateral acceleration on the vehicle increases, which leads to the steering wheel seeming to become heavier, and a sudden drop in steering wheel torque, such that the steering wheel seems to become much lighter, when the vehicle reaches understeer. This steering wheel torque drop is often referred to as the pneumatic trail effect.

Existing yaw stability control systems are used for controlling undesired vehicle motions due to e.g. understeer. In order to affect this control the rear inside wheel of the vehicle is braked to add a longitudinal force and reduce the lateral force of the braked wheel to generate a yaw moment to counteract the yaw moment disturbance generated by the tire force disturbance due to the front-to-rear tire lateral force difference. This brake intervention is in prior art yaw stability control systems usually performed as a function of yaw rate error.

However, as the experienced driver may perform compensatory steering based on the steering wheel torque feedback provided through the steering wheel, such compensatory steering may result in small yaw rate errors in the yaw stability control system, usually below a threshold of the yaw stability control system, wherefore no yaw stability control intervention will be performed by the prior art yaw stability control system. As a consequence thereof the rear axle tire to road friction of the vehicle will not be used in an optimal way.

Figure 2:
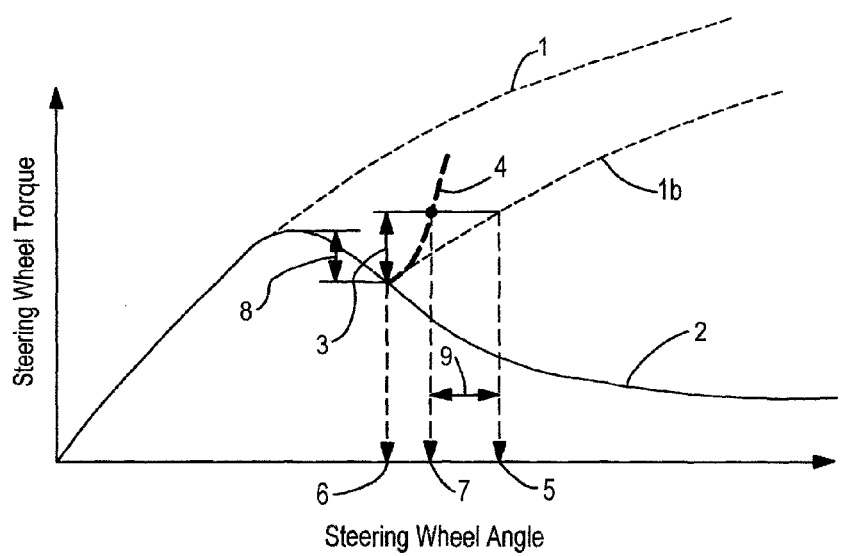
FIG. 2 is a graph showing steering wheel torque as function of steering wheel angle illustrating graphically the calculations in accordance with the present invention.

FIG. 2 is a graph showing steering wheel torque (SWT) as function of steering wheel angle (SWA) for a certain speed. The topmost dashed line 1 indicates steering wheel torque when the front wheels stay within the maximum lateral side force area, i.e. steering wheel torque in bicycle model with no understeer. The solid line 2 shows steering wheel torque when the front wheels saturate at maximum lateral side force, i.e. steering wheel torque in a real vehicle at understeer. Delta torque ($\Delta T_q$) (designated 3 in FIG. 1) is the guidance torque to be applied on the steering wheel.

In accordance with the present invention—in the case of understeer 2—it is suggested to, using the electric power assisted steering system, apply a guidance torque ($\Delta T_q$) 3 on the steering wheel and hence increase the steering wheel torque to guide the driver not to overturn the steering wheel in combination with providing a steering wheel angle 5 that indicates the driver intent to the yaw stability control system. Thus in accordance with the present invention it is ensured that full utilization of the tire to road friction at the front axle is achieved while at the same time the yaw stability control system is able to provide high intervention on the rear axle, e.g. through activating brakes, reducing engine torque, or varying the driving torque at individual wheels or axles.

The thick dashed black line 4 of FIG. 2 shows the effect of the guidance torque ($\Delta T_q$) 3 applied on the steering wheel. The lower dashed line $1b$ indicates the steering wheel torque when the front wheels stay within the maximum lateral side force area from the point of where guidance torque ($\Delta T_q$) 3 starts.

The driver intended steering wheel angle 5 is calculated as the angle that corresponds to the current steering wheel torque for high tire to road friction as found on the dashed line $1b$. It is the driver intended steering wheel angle 5, SWA_intention that will be sent to the yaw stability control system and on to e.g. the brake control system, not the actual steering wheel angle 7. The yaw stability control system will then give rear axle brake intervention at the same time as the front axle tire to road friction is fully utilized. Therefore, the stabilization at understeer situation will be increased. Delta angle ($\Delta A_n$) 9 is a steering wheel angle modifier that is added to the actual steering wheel angle, SWA_actual, to indicate driver intention (SWA_intention=SWA_actual+delta angle).

Figure 3:
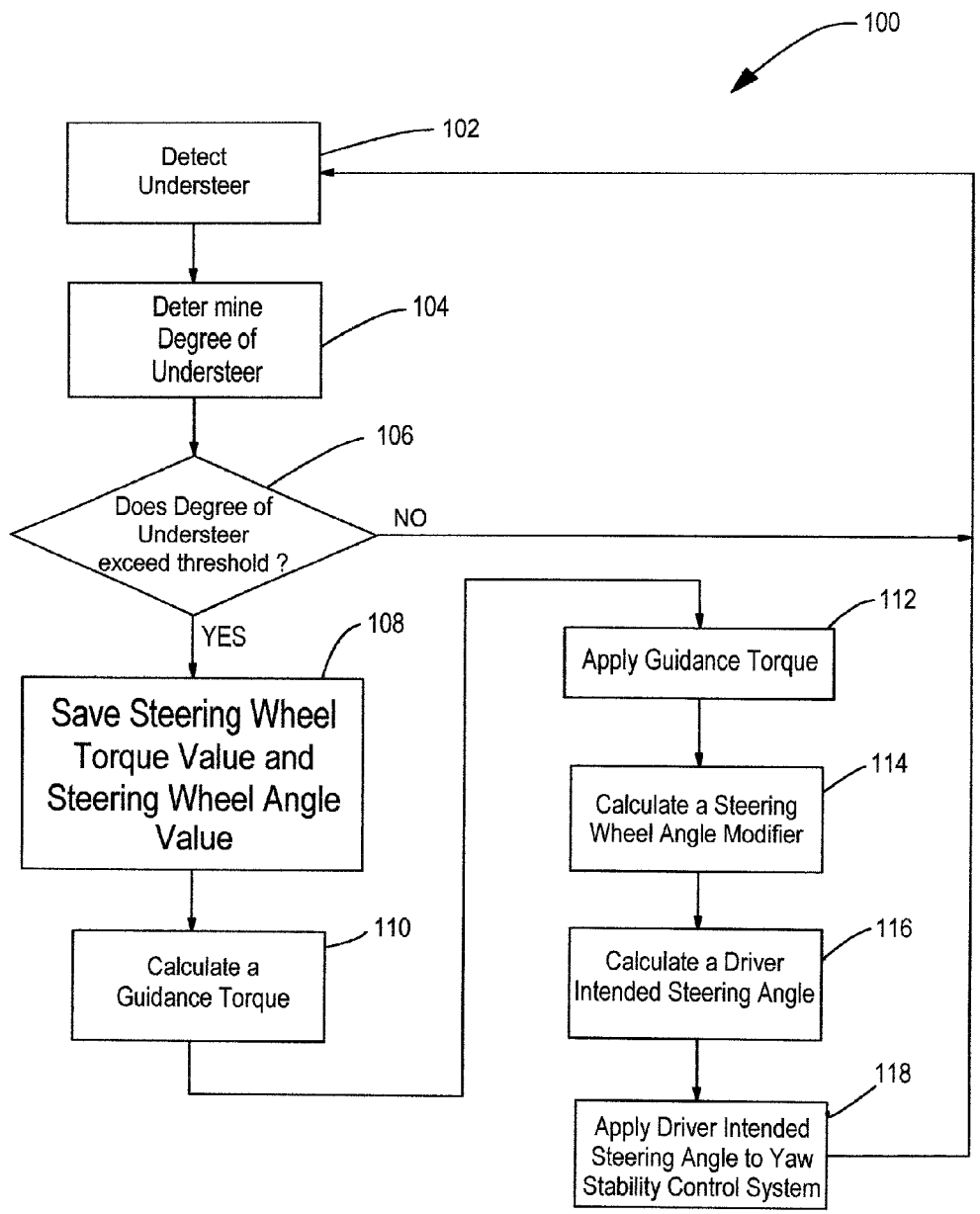
FIG. 3 is a discrete state diagram illustrating the different states of a system in accordance with the present invention.

FIG. 3 is a discrete state diagram 100 illustrating the different states of a system in accordance with the present invention. The first state is to detect understeer 102. In the first state, in order to detect understeer 102, a bicycle model, given some vehicle specific physical parameters, is used to estimate yaw rate and lateral acceleration from vehicle speed and steering wheel angle. While the bicycle model gives information how a vehicle behaves in a stable condition, sensor values of yaw rate and lateral acceleration tell how the vehicle actually behaves, no matter if it is stable or understeering. By comparing bicycle model values and sensor values it is possible to tell if the vehicle is at understeer or not. $\dot{\psi}_{mdl}$ is the yaw rate from the bicycle model. $\dot{\psi}_{meas}$ is the measured yaw rate from vehicle sensors. $\delta_{thres\_understeer}$ is a vehicle speed dependent threshold, i.e. $\delta_{thres\_understeer}=f(v)$. If $|\dot{\psi}_{mdl}-\dot{\psi}_{meas}|>\delta_{thres\_understeer}$, then understeer is detected 102.

It should be noted that the above algorithm is conceptual and intended mainly to provide an understanding of the variables used to determine the amount of understeer, and that the detection of understeer may be performed in other ways known to the person skilled in the art and incorporated into the present invention.

If the driver continues to steer in a conventional vehicle that reaches understeer, the steering wheel torque will drop, referred to as the pneumatic trail effect. In accordance with the present invention, once understeer is detected, a small torque drop is allowed before an understeer guidance torque, ΔTq, is applied. This is to allow experienced drivers to prevent too large understeer without being affected by a guidance torque, ΔTq, from the understeer algorithm.

Once the occurrence of understeer is detected 102, the degree of understeer is determined 104. Upon determination of the degree of understeer, a comparison 106 is made to a predetermined threshold value. If the threshold value has been exceeded, the method continues. If the threshold value has not been exceeded, the process of detecting 102 and determining the degree of understeer 104 is repeated.

In a first embodiment of determining the degree of understeer 104 a torque drop, $T_{qdrop}$, is determined by the difference between the steering wheel torque when the occurrence of understeer was detected and the current steering wheel torque. If the torque drop, $T_{qdrop}$, exceeds a threshold the calculation proceeds to the next step, otherwise it transits back to 102.

In another embodiment, the degree of understeer is determined 104 by determining the yaw rate error from the difference between the yaw rate from the bicycle model and the measured yaw rate from vehicle sensors. If the yaw rate error exceeds a threshold the calculation proceeds to the next step, otherwise it transits back to 102.

In still another embodiment, the degree of understeer is determined 104 from a change in steering rack force determined by the difference between an ideal steering rack force from the bicycle model and a measured steering rack force from vehicle sensors. If this difference in steering rack force exceeds a threshold, the calculation proceeds to the next step, otherwise it transits back to 102. As an alternative, the pinion torque may also be used in this embodiment.

Upon detection of understeer that exceeds a threshold 106, a steering wheel torque value and a steering wheel angle value are saved 108. In order to calculate the steering wheel guidance torque, ΔTq, the value of the steering wheel angle at the start of the guidance torque calculation is needed. Therefore, a steering wheel torque value and a steering wheel angle value are saved 108.

The guidance torque, ΔTq, is calculated 110 and applied 112 to the steering system. A steering wheel angle modifier is calculated 114 and a driver intended steering angle is calculated 116 using the steering wheel angle modifier and the guidance torque value. Referring again to FIG. 2, the guidance torque, ΔTq, is a linear function of change in steering wheel angle since the start 6 of the guidance torque, ΔTq, calculation. The steering wheel angle at the start of each guidance torque calculation, $SWA_{dTq\_start}$, shall in case of the second or third alternative embodiments continuously be updated by the use of the yaw rate error or change in steering rack force. Referring back to FIG. 3 the guidance torque is calculated 110 from the steering wheel angle difference from the start angle times a tunable gain k. The guidance torque is smoothly limited to a max value by use of a suitable constant T. The guidance torque is applied 112 to the steering system.

$$\Delta Tq = sat((SWA_{actual} - SWA_{dTq\_start})*k, -T, T) \quad (1)$$

The steering wheel angle modifier is calculated 114 to determine how large additional angle would be needed to obtain the driver intended steering wheel angle 116 assuming high tire to road friction and no guidance torque compensation.

The steering wheel angle modifier is calculated 114 from a linear bicycle model using the delta torque (ΔTq), torque derivative with respect to lateral acceleration ($dTq/da_y$), vehicle speed (v), and quasi-static ratio between yaw rate and steering wheel angle $$\left(k_{\frac{d\dot\psi}{dSWA}}\right).$$

$$\dot\psi * v = a_y \quad (2)$$
$$\Rightarrow \Delta\dot\psi * v = \Delta a_y$$
$$\Rightarrow \left(\Delta An * k_{\frac{d\dot\psi}{dSWA}}\right) * v = \frac{\Delta Tq}{dTq/da_y}$$

As long as the occurrence of understeer is detected the understeer guidance torque is applied 112 to guide the driver not to turn the steering wheel even further at understeer and the driver intended steering wheel angle 116 is sent 118 to the yaw stability control system and e.g. on to the brake control system, which will then give rear axle brake intervention at the same time as the front axle tire to road friction is fully utilized.

Referring still to FIG. 3, if the occurrence of understeer is not detected to exceed a threshold 106, the method transitions back to detecting 102. Thus, in accordance with the present invention, the stabilization at understeer situations will be increased.

In accordance with the present invention is also envisaged an automotive vehicle, which comprises a yaw stability control system as described above. Furthermore, in accordance with the present invention is also envisaged a method of controlling a yaw stability control system for a vehicle equipped with electric power assisted steering. In accordance with the present invention the method comprises the steps of: detecting the occurrence of understeer 102, determining the degree of understeer 104 after the occurrence of understeer is determined, determining if the determined degree of understeer exceeds a threshold value 106, saving the steering wheel torque value and steering wheel angle value 108 when determined that the determined degree of understeer exceeds the threshold value, calculating and applying a guidance torque 110, calculating a steering wheel angle modifier 114, and updating the steering wheel angle at the start of guidance torque calculation; applying 112 the calculated guidance torque to the steering of the vehicle, calculating a driver intended steering wheel angle 116 and using it for controlling yaw stability control operations 118.

The principles of the present invention may be used to trigger understeer braking interventions at one or more of the wheels of the vehicle, both in order to generate a course correcting yaw moment as well as for retarding the vehicle. Furthermore, the principles of the present invention may also be used to trigger further yaw stability control operations such as reducing engine torque or varying the driving torque at individual wheels or axles.

The principles of the present invention may be used to trigger understeer braking interventions at one or more of the wheels of the vehicle, both in order to generate a course correcting yaw moment as well as for retarding the vehicle.

Furthermore, the principles of the present invention may also be used to trigger further yaw stability control operations such as reducing engine torque or varying the driving torque at individual wheels or axles.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for controlling a yaw stability control system for a vehicle having an electric power assisted steering system, the method comprising the steps of:
   detecting understeer;
   determining a degree of understeer;
   comparing the degree of understeer to a predetermined threshold value;
   calculating a guidance torque;
   calculating a steering wheel angle modifier upon initiation of calculating a guidance torque;
   applying the guidance torque to the power assisted steering system;
   calculating a driver intended steering wheel angle using a measured steering wheel angle and the calculating steering wheel angle modifier;
   applying the driver intended steering wheel angle as an input for the yaw stability control system.

2. The method as claimed in claim 1 wherein the step of detecting understeer further comprises the steps of:
   estimating yaw rate from vehicle speed and steering wheel angle; and
   estimating lateral acceleration from vehicle speed and steering wheel angle.

3. The method as claimed in claim 1 wherein the step of determining a degree of understeer further comprises the step of calculating a change in steering wheel torque when understeer is detected and the predetermined threshold value is a steering wheel torque threshold value.

4. The method as claimed in claim 3 wherein the step of calculating a change in steering wheel torque when understeer is detected further comprises the steps of:
   measuring a steering wheel torque upon detection of understeer;
   measuring a steering wheel torque at a point in time after the detection of understeer to define a current steering wheel torque; and
   calculating the difference between the steering wheel torque upon detection of understeer and the current steering wheel torque.

5. The method as claimed in claim 1 wherein the step of determining a degree of understeer further comprises the step of calculating a yaw rate error upon detection of understeer and the predetermined threshold value is a yaw rate error threshold value.

6. The method as claimed in claim 1 wherein the step of determining a degree of understeer further comprises the step of calculating a change in a steering rack force upon detection of understeer and the predetermined threshold value is a steering rack force threshold value.

7. The method as claimed in claim 1 wherein the step of calculating a guidance torque further comprises calculating the guidance torque from a linear function of a change in the steering wheel angle from at point in time at the start of the guidance torque calculation.

8. The method as claimed in claim 7 wherein the step of calculating the guidance torque further comprises calculating the guidance torque as a function of a change in steering wheel angle over a predetermined time beginning at the detection of understeer and using a tunable gain, k, and a suitable constant, ±T for limiting the guidance torque to a predetermined maximum value.

9. The method as claimed in claim 8 further comprising applying an assumption of high tire to road friction and the absence of guidance torque compensation.

10. The method as claimed in claim 9 wherein the step of calculating a steering wheel angle modifier upon initiation of calculating a guidance torque further comprises using a linear bicycle model using the calculated guidance torque, a derivative of the calculated guidance torque with respect to a lateral acceleration, a vehicle speed, and a quasi static ratio between a yaw rate and a steering wheel angle.

11. The method as claimed in claim 10 further comprising the step of applying the driver intended steering wheel angle as an input for the electric power assisted steering system.

12. A method of controlling a yaw stability control system for a vehicle having an electric power assisted steering system, the method comprising the steps of:
   determining the occurrence of understeer;
   determining the degree of understeer after the occurrence of understeer is determined;
   determining if the determined degree of understeer exceeds a threshold value;
   saving the steering wheel torque value and steering wheel angle value when determined that the determined degree of understeer exceeds the threshold value;

calculating a guidance steering wheel torque and steering wheel angle modifier and updating the steering wheel angle at the start of guidance steering wheel torque calculation;

applying the calculated guidance steering wheel torque to the steering of the vehicle; and calculating a driver intended steering wheel angle using the steering wheel angle modifier;

controlling yaw stability using the driver intended steering wheel angle.

13. The method as claimed in claim 12 wherein the step of determining a degree of understeer further comprises the step of calculating a change in steering wheel torque when understeer is detected and the predetermined threshold value is a steering wheel torque threshold value.

14. The method as claimed in claim 13 wherein the step of calculating a change in steering wheel torque when understeer is detected further comprises the steps of:

measuring a steering wheel torque upon detection of understeer;

measuring a steering wheel torque at a point in time after the detection of understeer to define a current steering wheel torque; and calculating the difference between the steering wheel torque upon detection of understeer and the current steering wheel torque.

15. The method as claimed in claim 12 wherein the step of determining a degree of understeer further comprises the step of calculating a yaw rate error upon detection of understeer and the predetermined threshold value is a yaw rate error threshold value.

16. The method as claimed in claim 12 wherein the step of determining a degree of understeer further comprises the step of calculating a change in a steering rack force upon detection of understeer and the predetermined threshold value is a steering rack force threshold value.

17. The method as claimed in claim 12 wherein the step of calculating a guidance torque further comprises calculating the guidance torque from a linear function of a change in the steering wheel angle from at point in time at the start of the guidance torque calculation.

18. The method as claimed in claim 17 wherein the step of calculating the guidance steering wheel torque further comprises calculating the guidance steering wheel torque as a function of a change in steering wheel angle over a predetermined time beginning at the detection of understeer and using a tunable gain, k, and a suitable constant, ±T for limiting the guidance steering wheel torque to a predetermined maximum value.

19. The method as claimed in claim 18 further comprising applying an assumption of high tire to road friction and the absence of guidance steering wheel torque compensation.

20. The method as claimed in claim 19 wherein the step of calculating a steering wheel angle modifier upon initiation of calculating a guidance torque further comprises using a linear bicycle model using the calculated guidance torque, a derivative of the calculated guidance torque with respect to a lateral acceleration, a vehicle speed, and a quasi static ratio between a yaw rate and a steering wheel angle.

21. The method as claimed in claim 12 wherein the step of determining the occurrence of understeer further comprises the step of estimating yaw rate and lateral acceleration from vehicle speed and steering wheel angle.

* * * * *